Figure 1:
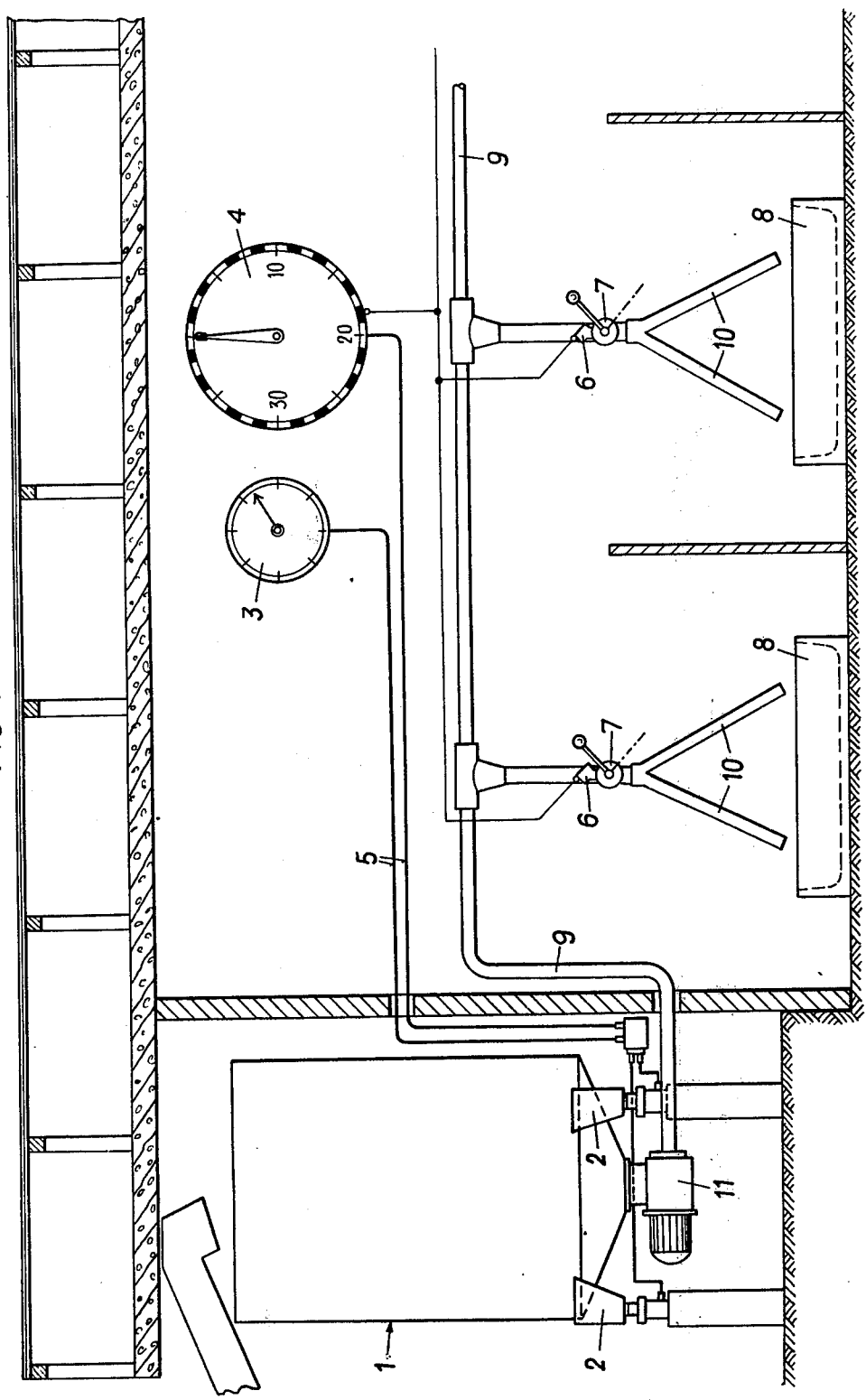

United States Patent [19]

Wolf

[11] 4,141,321
[45] Feb. 27, 1979

[54] ANIMAL FEEDING INSTALLATION

[75] Inventor: Johann Wolf, Scharnstein, Austria

[73] Assignee: Johann Wolf Gesellschaft m.b.H. KG., Scharnstein, Austria

[21] Appl. No.: 775,990

[22] Filed: Mar. 9, 1977

[30] Foreign Application Priority Data

Mar. 15, 1976 [AT] Austria ................................ 1880/76

[51] Int. Cl.² .............................................. A01K 5/00
[52] U.S. Cl. ............................ 119/51 R; 119/52 AF; 119/56 R
[58] Field of Search ............. 119/51 R, 51.11, 52 AF, 119/56 R; 222/77

[56] References Cited

U.S. PATENT DOCUMENTS

| 2,929,356 | 3/1960 | Bacigalupo | 119/51 R |
| 3,553,441 | 1/1971 | Launder | 119/51 R X |
| 3,720,185 | 3/1973 | Aldous et al. | 119/51.11 |
| 3,918,405 | 11/1975 | Hostetler | 119/52 AF |

Primary Examiner—Hugh R. Chamblee
Attorney, Agent, or Firm—Young & Thompson

[57] ABSTRACT

An installation for delivering flowable feed to a plurality of animal feeding stations comprises a feed storage container and a delivery conduit connected to said container and having an outlet and adapted to deliver feed from said container to and through said outlet. A shut-off valve controls the delivery of feed through said outlet. The quantity of feed to be removed from said container during a delivery of feed through said outlet is predetermined, and an indicator indicates when that quantity has been dispensed.

16 Claims, 2 Drawing Figures

ANIMAL FEEDING INSTALLATION

This invention relates to an animal feeding installation for delivering a controlled quantity of dry or liquid feed to individual feeding stations through delivery conduits from a feed storage container, which is connected to weighing or quantity-measuring means, wherein the delivery conduits leading from the feed storage container to the feeding stations are adapted to be opened and closed by valves.

In view of the different food requirements of individual animals and the variety of feeds, the feed ration for each feeding station must be individually controlled and must be changed from time to time in dependence on requirements. Such apportioning of the feed to individual feeding stations is necessary for an optimum conversion of the feed into a weight gain of the animals and in order to prevent the presence of residual feed at the feeding stations. Such residual feed would become spoiled after a short time, particularly in case of liquid feed, and would then endanger the health of the animals or decrease their appetite and consequently the desired gain in weight.

Circular ring installations comprising a closed pipe system have been disclosed, in which chains or ropes revolve, which carry flights, by which dry feed is removed from a supply bin and is supported to the several feeding troughs preferably at a controlled volume rate or under the control of weighing appliances associated with each feeding station. Other known installations comprise branch conduits leading to pens arranged in a straight line.

In other known installations, a pumpable (liquid) feed is delivered in closed pipes by means of paddle wheel, centrifugal or screw pumps to the individual feeding stations. It is also known to provide wheeled storage bins (feed carts), from which the feed is mechanically conveyed to the troughs.

In both cases, i.e., with dry feed and pumpable feed, the rationing at the individual feeding stations is either visually controlled as a result of an estimation of the quantity which has been delivered, or of the measurement of a volume batch by means of a measuring vessel, or of a time measurement; in the latter case, the delivered quantity is determined by the delivery time. These control measures are based only on estimates and are rather inaccurate and, for this reason, inadequate for an efficient keeping of animals.

For this reason, installations have been disclosed in which the quantity which is delivered to each feeding station can be accurately weighed. This weight control is the most reliable and most exact method of controlling the quantity of feed to be delivered to each feeding station so that said quantity can be changed from time to time as desired and be adapted to the growth of the animals. On the other hand, such installations involve a high structural expenditure because a weighing appliance must be provided at each feeding station. Besides, the setting of the weighing appliance must often be changed in view of changes in the appetite and growth of the animals and of the number of animals in each pen; such change of the setting is a complicated and time-consuming operation. Moreover, these appliances must be cleaned and serviced from time to time and such cleaning and servicing as well as the changing of the setting of the appliances is most disagreeable because the person who performs these operations must enter the pens, which in most cases are very dirty.

Opened German Specification No. 2,035,476 discloses an animal feeding method in which the quantity of feed delivered to each feeding unit is weighed under program control by a central weighing appliance and the weighed feed is delivered by a wheeled implement to the feed containers. In accordance with that reference, the central weighing appliance may be associated with a feed storage container and shut-off means may be associated with the wheeled feed delivery implements. That process requires an expensive installation, which is electronically controlled, as a rule, and which is economical only in large farms for accommodating 50,000 animals or more.

These disadvantages which are inherent in the state of the art, such as an inaccurate or visually estimated or volumetric quantity control or the high structural expenditure involved in the known weighing appliances and the inconvenience which is due to the need for entering the pens to change the setting and servicing of the appliances are to be avoided by the present invention, which results in an exact quantity control in conjunction with a low structural expenditure.

In a feeding installation of the type described first hereinbefore, this object underlying the invention is accomplished in that at least one display unit and/or signal generator is provided, which is controlled by the weight- or quantity-measuring appliance and indicates the quantity of feed which has been taken from the feed storage container and delivered at one feeding station.

In the feeding installation according to the invention, the several feed rations are most exactly controlled by weighing or by a quantity measurement, and a single weighing or quantity-measuring appliance is sufficient for all feeding stations. If the installation is to serve a plurality of detached buildings for animals or a plurality of compartments a, display unit or a signal generator should be mounted in each such building or compartment at an easily visible location unless a storage container provided with a weighing or quantity-measuring appliance is associated with each building or compartment.

Within the scope of the invention, the weighing or quantity-measuring appliance may be coupled to a contacting mechanism, which serves to control the signal generator for an indication of perdetermined increments of feed delivered from the feed storage container to a feeding station. The repetitive visual or audible indication permits of an indication of the quantity of feed delivered from the feed storage container to each feeding station in predetermined, small increments of weight or volume so that the quantity intended for a given feeding station can be determined by an integration of the predetermined increments which have been indicated.

In one embodiment of the invention, the predetermined increment which is repetitively indicated during the delivery of feed can be selected as desired in that a speed-reducing transmission having a variable transmission ratio is incorporated between the weighing or quantity-measuring appliance and the contacting mechanism. The increment should be about 1/10 or less than an average feed ration. In no case should that predetermined increment exceed the permissible deviation of an average feed ratio from the prescribed weight or quantity.

The feed storage container may stand on or be suspended from a weighing appliance. In accordance with a preferred feature of the invention, a display unit for indicating the quantity of feed in the feed storage container may be connected to the weighing appliance. In most cases, so-called pick-ups are used for this purpose and the signals from said pick-ups are transmitted electrically or hydraulically.

The weighing appliance or the display unit for indicating the quantity delivered to any feeding station is connected by a speed-reducing mechanical or hydraulic transmission to a disc-shaped or cylindrical contact carrier. The predetermined increment of weight or quantity corresponds to one step of the contacting mechanism. For instance, the latter assumes a circuit-closing position whenever a certain quantity of feed, e.g., 2 kg, has been delivered. The selection of the transmission ratio of the means for driving the contacting mechanism and of the number of contacts permits of a setting of a predetermined increment of weight.

The weighing appliance may be replaced by a metering pump, which is connected to the contacting mechanism by a speed-reducing transmission. The quantities may be electrically measured if an inductive sensor is incorporated in the discharge line from the pump and is connected to a pulse generator, which causes an indication of the predetermined increments of quantity by signals transmitted to the feeding station.

The several feeding stations are connected to the feed storage container by a pipeline, which communicates with each feeding station through an outlet, which is adapted to be closed by a shut-off gate valve. A visual or audible signal generator is provided, which is visible from or audible at the feeding stations. A visual signal generator will suitably be provided at each feeding station or at a location which is conveniently visible from all feeding stations of a group. Where audible signals are employed, one or two audible signal generators will be sufficient, depending on the size of the room. Whenever the contacting mechanism assumes a circuit-closing position, the circuit which includes the signal generators is closed so that a signal is generated. To simplify the wiring, the several signal generators are connected in parallel to each other.

For the feeding operation, a circulating pump, screw conveyor etc. is energized to convey the feed in the pipeline. To deliver the feed to a feeding station, the operator opens the shut-off gate valve associated therewith and then counts the visual or audible signals to ascertain the quantity which has been delivered. For instance, when 20 kg of feed are to be delivered to a feeding station and an increment of 2 kg has been predetermined, the operator must count 10 signals when he has opened the gate valve.

In this simple manner, the quantity of feed delivered to each feeding station can be controlled in a simple manner and the operator can watch the animals as they take up the feed.

The feed storage container is disposed, e.g., outside the building for the animals or in another room thereof and may be mechanically charged from a silo and hold a supply for one day or several days. This feed storage container succeeds the silo and has a limited capacity so that the difference in weight between the full container and each feed ratio is not excessive because this would reduce the accuracy of the weighing of the individual rations.

In feeding installations in which a high accuracy is not required, a succeeding storage container may be omitted and the feed may be taken directly from the silo, which in that case is directly connected to the weighing appliance.

Depending on the layout of the building for animals, e.g., when the animals are kept in an elongated area which extends longitudinally of the building, a fixed installation may be replaced by a feed cart, which is also provided with a weighing appliance as well as with a conveniently readable weight display unit for the delivered rations and with means for resetting the display unit in response to the closing movement of the gate valve or a separate, manually operable device. That feed cart may be designed as a multicomponent cart for a plurality of kinds of feed, in that case a single weighing and display system will also be sufficient. Such feed cart may carry a feed storage container, which is supported by pick-ups or pressure cells. The feed cart carries also the display and the delivering conduits provided with the shut-off valves. The feed cart may run on ground wheels or be provided with track rollers running on rails or on an overhead track.

Because the delivery of feed at each feeding station takes only a short time, the display unit may be designed to be automatically reset to the zero graduation of the scale after an interval of time. The interval of time from the beginning of the movement of the pointer to its resetting to the zero graduation of the scale is selected to be larger than or at least as large as the longest time required for the delivery of the the largest feed ration to be expected. This resetting can be accomplished by a simple mechanism because the timed resetting mechanism can be directly incorporated in the display unit. Whereas the overall feeding time is slightly prelonged in this case, this slight extra time is required in any case because the operator must walk from one feeding station to the next and should watch the animals during that time.

Instead of a resetting of the indicator to zero after a predetermined time, the resetting may be effected in response to electrical pulses which are initiated by the closing of any of the gate valves. To that end, each gate valve is connected to a make contact and these make contacts are connected to the resetting device by leads. As has been described hereinbefore, a separate switch may be provided, which is disposed near the gate valve and must be actuated when the gate valve has been closed. That embodiment of the invention which calls for a manual operation of gate valves at the feeding stations and a central weight display unit constitutes a low-cost installation which is reliable and accurate in operation.

The feed storage container is supported by pressure pick-ups, such as hydraulic pick-ups or electric pick-ups (weight sensors), which deliver weight signals in hydraulic or electric lines to a display unit, which is installed within the building for the animals at a location which is easily visible or audible from all feeding stations. When a single feed storage container is used to supply a plurality of buildings for animals, indicators connected in parallel will be provided in respective buildings.

The visual display afforded by the weighing appliance is so large that it is readable from a distance which is as least as large as the length of the building. This display unit is arranged to indicate the weight of the feed ration which has been delivered rather than the net weight of feed in the feed storage container.

If, e.g., the feed supply has a net weight of 2000 kg and a ration of 25 kg has been delivered, the display appliance will indicate 25 kg rather than 1975 kg so that the quantity of feed that has been delivered can be read directly. That feature does not add to the cost because it is sufficient to mark the scale accordingly.

Because the display unit is provided with means for resetting to zero, the indicating range need not substantially exceed the largest individual ration so that the scale can be designed to be clearly arranged and readable from a relatively large distance.

A second display unit for indicating the net weight of feed in the feed storage container may be connected in parallel to the first-mentioned display unit and may provide for a separate display or be combined with the ration display unit.

Figure 2:
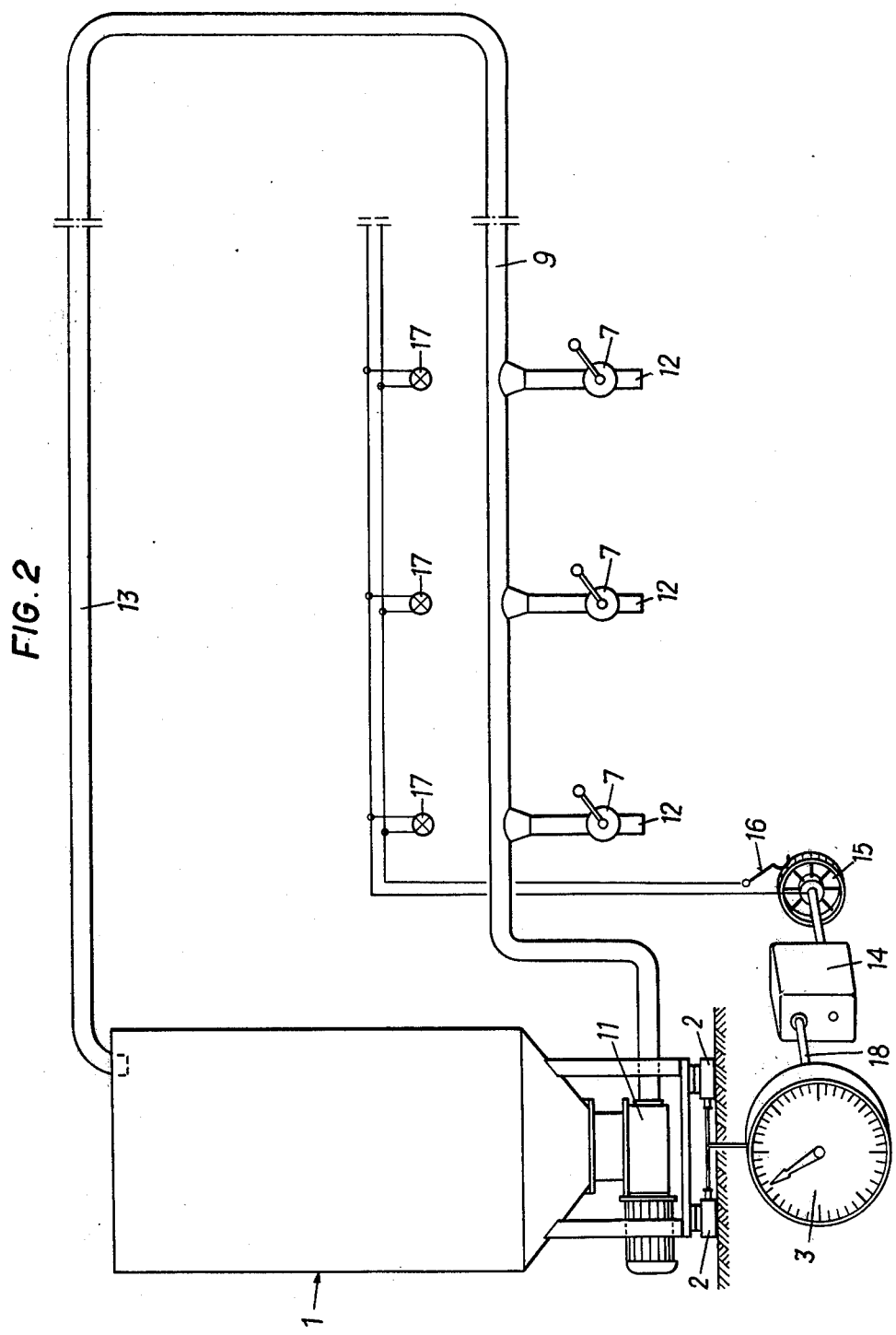

Details of feeding installations embodying the invention will be explained with reference to the accompanying diagrammatic drawings, in which FIG. 1 shows an installation for delivering flowable feed, FIG. 2 shows installation for delivering liquid feed.

In the embodiment shown in FIG. 1, which is intended for delivering flowable feed, such as liquid feed or flowable solid feed, a feed storage container 1 stands on a weighing appliance 2, e.g., on hydraulic pick-ups, and the signals generated by said pick-ups are transmitted by hydraulic conduits 5 to, e.g., two separate display units 3, 4. The display unit 3 indicates the net weight of the feed stored in the feed storage container, and the display unit 4 displays the weight of the feed ration which is being taken. The pointer of the display unit 4 is electrically reset in response to the closing of switches 6, which are actuated in response to the closing of shut-off gate valves 7 provided at feeding stations 8.

The feed is offered in longitudinal or annular troughs at each feeding station 8, to which it is delivered through pipelines 9 and succeeding branch pipes 10 or annular distributors by feed-handling means 11 comprising a pump for liquid feed or a screw conveyor for flowable solid feed. The pipe system is always filled with feed and is closed at each feeding station 8 by a shut-off gate valve 7, which can be opened to initiate the delivery of the liquid or dry feed to the trough. The manual actuation of the shut-off valve in conjunction with the reading of the display unit 4 permits of an accurate control of the delivery of feed to each feeding station 8.

The quantity of feed to be delivered to each feeding station 8 is predetermined and is indicated at each feeding station on a signboard. Alternatively it is possible to use paper tapes bearing preprinted weight data or cards provided with slidable tabs or pointers.

The installation shown in FIG. 2 is indicated for a delivery of liquid feed. A storage vessel 1 is adapted to hold feed in a quantity which is sufficient for several days and rests on a weighing appliance, e.g., on pick-ups 2, from which signals are electrically or hydraulically transmitted to a display unit 3, from which the quantity of feed stored in the feed storage container 1 can be read at any time. A pump 11 is incorporated in the feed storage container 1 or in a pipeline 9 and delivers the liquid feed from the latter, which is connected to each feeding station by an outlet pipe 12 provided with a shut-off gate valve 7.

The display unit 3 is mechanically connected by a shaft 18 to a speed-reducing transmission 14, the output member of which carries at its periphery a disc-shaped or cylindrical contact carrier 15, which carries grounded contacts, which are spaced equal peripheral distances apart and are engageable by a wiper contact 16. Signal generators 17 consisting of incandescent bulbs, buzzers or the like are connected in parallel in a low-voltage circuit which leads from the wiper contact 16 to one terminal of a voltage source, the other terminal of which is grounded.

When a shut-off gate valve 7 is opened, feed flows into the feed trough of the respective feeding station and in dependence on the weight or volume of the outflowing feed the display unit 3 and the speed-reducing transmission 14 impart such a movement to the disc-shaped or cylindrical contact carrier 15 that the latter is advanced by one contact pitch and a signal is generated whenever a predetermined weight increment has been taken. These signals are counted by the operator until the desired feed ration has been delivered to the feeding station. Feed which has not been delivered is returned in a return conduit 13 to the feed storage container 1.

Instead of this control of the weight of the feed which is delivered, the volume of the feed which is delivered can be controlled. In that case the feed is circulated and the pipeline by a metering pump, which is connected to the contact carrier by a suitable speedreducing transmission. The operation is the same as described hereinbefore in other respects.

What is claimed is:

1. An installation for delivering flowable feed to a plurality of animal feeding stations, comprising a feed storage container, delivery conduit means connected to said container and having outlet means and being adapted to deliver feed from said container to and through said outlet means, shut-off valve means for controlling the delivery of feed through said outlet means, measuring means connected to said container to measure the quantity of feed which has been removed from said container during the delivery of feed through said outlet means, indicating means connected to said measuring means to indicate the quantity which has been measured by said measuring means, said indicating means comprising at least one signal generator, and a contacting mechanism which is controlled by said measuring mechanism to operate said at least one signal generator in response to the measuring of a predetermined selected increment of feed by control of said shut-off valve means.

2. An installation as set forth in claim 1, in which said measuring means comprise weighing means.

3. An installation as claimed in claim 1, in which said measuring means are arranged to measure the volume of feed which has been removed from said container during the delivery of feed through said outlet means.

4. An installation as set forth in claim 1, in which said indicating means comprise at least one display unit.

5. An installation as set forth in claim 4, in which
said outlet means comprise a plurality of outlets disposed at respective feeding stations,
said shut-off valve means comprise a plurality of shut-off valves arranged at respective ones of said outlets, and
said display unit is arranged to assume an initial position when all said shut-off valves are closed.

6. An installation as set forth in claim 4, in which said container is stationary, said measuring means comprise weight pickups supporting said container, said outlet means comprise a plurality of outlets disposed at respective feeding stations, said shut-off valve means comprise a plurality of shut-off valves arranged at respective ones of said outlets, and said display unit is centrally disposed in a buidling for animals.

7. An installation as set forth in claim 4, in which said container is movable to a plurality of feeding stations in a building for animals, said measuring means comprise weight pick-ups which support said container and are movable with the latter, and said display unit is mounted on said container.

8. An installation as set forth in claim 1, in which said measuring means comprise a display unit for displaying the quantity of feed in said container.

9. An installation set forth in claim 1, in which said measuring means are connected to said contacting mechanism by a speed-reducing transmission having a variable transmission ratio.

10. An installation as set forth in claim 9, in which said indicating means comprise a display unit connected to said measuring means and a shaft connecting said display unit to said speed-reducing transmission.

11. An installation as set forth in claim 1, in which said contacting mechanism comprises a rotary contact carrier, a plurality of grounded contacts carried by said contact carrier, and a wiper contact adapted to cooperate with said grounded contacts and connected to said at least one signal generator.

12. An installation as set forth in claim 11, in which a plurality of said signal generators are connected to said wiper contact in parallel to each other.

13. An installation as set forth in claim 1, in which said outlet means comprise a plurality of outlets disposed at respective feeding stations, said shut-off valve means comprise a plurality of shut-off valves arranged at respective ones of said outlets, and said delivery conduit means comprise a main delivery conduit connected to said container and a plurality of branch conduits connected to said main conduit and provided with respective ones of said outlets.

14. An installation as set forth in claim 13, in which a return conduit is connected to said main delivery conduit behind said branch conduits and to said container and said main delivery conduit incorporates feed-handling means operable to convey feed from said container in said main delivery conduit into said branch conduits and said return conduit.

15. An installation as set forth in claim 14, in which said feed-handling means comprise a pump.

16. An installation as set forth in claim 14, in which said feed-handling means comprise a conveyor screw.

* * * * *